(12) United States Patent
Fournier et al.

(10) Patent No.: US 7,507,940 B2
(45) Date of Patent: Mar. 24, 2009

(54) LASER UNDERWATER CAMERA IMAGE ENHANCER

(75) Inventors: Georges Fournier, Lac Beauport (CA); Luc Forand, Ste-Foy (CA); Pierre Mathieu, Cap-Rouge (CA)

(73) Assignee: Her Majesty the Queen as represented by the Minister of National Defence of Her Majesty's Canadian Government, Ottawa (CA)

( * ) Notice: Subject to any disclaimer, the term of this patent is extended or adjusted under 35 U.S.C. 154(b) by 97 days.

(21) Appl. No.: 11/335,471

(22) Filed: Jan. 20, 2006

(65) Prior Publication Data

US 2007/0170347 A1 Jul. 26, 2007

(51) Int. Cl.
*G02B 7/04* (2006.01)
(52) U.S. Cl. ...................... 250/201.4; 348/81
(58) Field of Classification Search .............. 250/201.4; 348/81
See application file for complete search history.

(56) References Cited

U.S. PATENT DOCUMENTS

| 4,394,573 | A | * | 7/1983 | Correa et al. ................ 250/253 |
| 4,576,458 | A | * | 3/1986 | Cho et al. .................... 396/147 |
| 4,914,460 | A | * | 4/1990 | Caimi et al. .................. 396/28 |
| 4,948,258 | A | * | 8/1990 | Caimi ........................ 356/603 |
| 4,999,681 | A | * | 3/1991 | Mader ........................ 356/457 |
| 5,303,051 | A | | 4/1994 | Levesque et al. |
| 6,707,761 | B2 | * | 3/2004 | Erikson ...................... 367/131 |
| 6,873,716 | B1 | * | 3/2005 | Bowker et al. .............. 382/128 |
| 2007/0058038 | A1 | * | 3/2007 | David et al. ................. 348/135 |

* cited by examiner

*Primary Examiner*—Thanh X Luu
*Assistant Examiner*—Kevin Wyatt
(74) *Attorney, Agent, or Firm*—Stites & Harbison PLLC; Ross F. Hunt, Jr.

(57) ABSTRACT

An apparatus to obtain images of a target by an underwater video camera in a waterproof container wherein the target is illuminated by a laser beam. The shutter of the video camera is kept closed until a laser pulse has covered the distance to the target and nearly back to reduce the effect of reflection of the laser pulse by particles in the water. A holographic beam shaper in the path of the laser beam before a diverging lens is used to provide a 4 by 3 aspect ratio the same as the camera to illuminate the target.

10 Claims, 5 Drawing Sheets

LASER UNDERWATER CAMERA IMAGE ENHANCER

FIELD OF THE INVENTION

The present invention relates to a video camera wherein a laser beam is used to illuminate a target in the field-of-view of the camera and, in particular, to an arrangement to increase the range of visibility of the video camera.

BACKGROUND OF THE INVENTION

Visibility for an underwater video camera is reduced by the presence of suspended particles in the water, which act in a similar manner as fog. When driving in fog, one can see the lights of other vehicles long before one can see the other vehicle in one's own headlights. This occurs as a person is distracted by the brightness of reflection from fog particles near one's own headlights. This reflected bright light prevents one from seeing dimmer targets further away.

One present way to improve the visibility of an underwater camera is to significantly separate an illumination source from the camera. However, the separation that can be achieved is limited by the width of the platform on which the illumination source and camera are located and can only provide a slight improvement.

Water currents stir up underwater particles, and as a result, their locations in a field-of-view of an underwater camera change over a period of time. U.S. Pat. No. 5,303,051 by Martin Lévesque et al describes one method of reducing the effect of underwater particles on an image by obtaining a sequence of images of an underwater scene and then comparing one image of a scene in the sequence with the others and determining the difference in each scene pixel-by-pixel. The movement of particles in the water results in different areas in each image in a sequence of images being obscured by any one particle such that by comparing pixel-by-pixel different areas in each image, a valid value for each pixel can be determined. Then a reconstructed image can be constructed from the valid values for all pixels, which significantly reduces the effect of particles in the final reconstructed image.

SUMMARY OF THE INVENTION

It is an object of the invention to increase the useful range of visibility for a video camera, wherein a laser beam illuminates a target in the field-of-view of the video camera.

An apparatus to obtain images of an underwater target that is located in the field-of-view of a video camera in a waterproof container according to one embodiment of the present invention includes a means to determine the distance between the container and the target, and a laser to illuminate the target with a laser beam, a pulse from the laser beam being directed to a holographic beam shaper located between the laser and a diverging lens that directs laser beams from the beam shaper towards the target, the video camera's shutter being kept closed until the laser beams travel to the target and then nearly back to the camera and means then to open the camera's shutter and obtain an image of the target.

BRIEF DESCRIPTION OF THE DRAWINGS

The following detailed description of the invention will be more readily understood when considered in conjunction with the accompanying drawings, wherein.

DESCRIPTION OF A PREFERRED EMBODIMENT

Visibility for an underwater video camera is reduced by the presence of suspended particles in the water, which act in a similar manner as fog. When driving in fog, one can see the lights of other vehicles long before one can see the other vehicle in one's own headlights. This occurs as a person is distracted by the brightness of reflection from fog particles near one's own headlights. This reflected bright light, prevents one from seeing a dimmer target further away.

One present way to improve the visibility and range of an underwater camera is to significantly separate an illumination source from the camera. The separation, which can be achieved, however, is limited by the width of a vehicle on which the illumination source and camera are located. The separation distance that can be achieved by this method will only provide a slight improvement.

The effect of suspended particles in water on an image obtained by a video camera located in a waterproof container can be reduced by using a short laser pulse to illuminate a target in the field-of-view of the video camera, and waiting until the laser pulse has covered the distance to the target and nearly back before opening the camera's shutter. This procedure according to the present invention, will prevent the video camera from receiving most of the light from the laser that is reflected back by suspended particles to the camera since mainly light reflected by the target will be received by the video camera as its shutter remains closed during the time any other light from the laser is reflected by particles in the water. This procedure can be repeated for a number of pulses from the laser. A sonar, the PS4916 from Beathos, is attached to the outside front of the container for the camera and is used to determine the range to the closest target under investigation.

Figure 1:
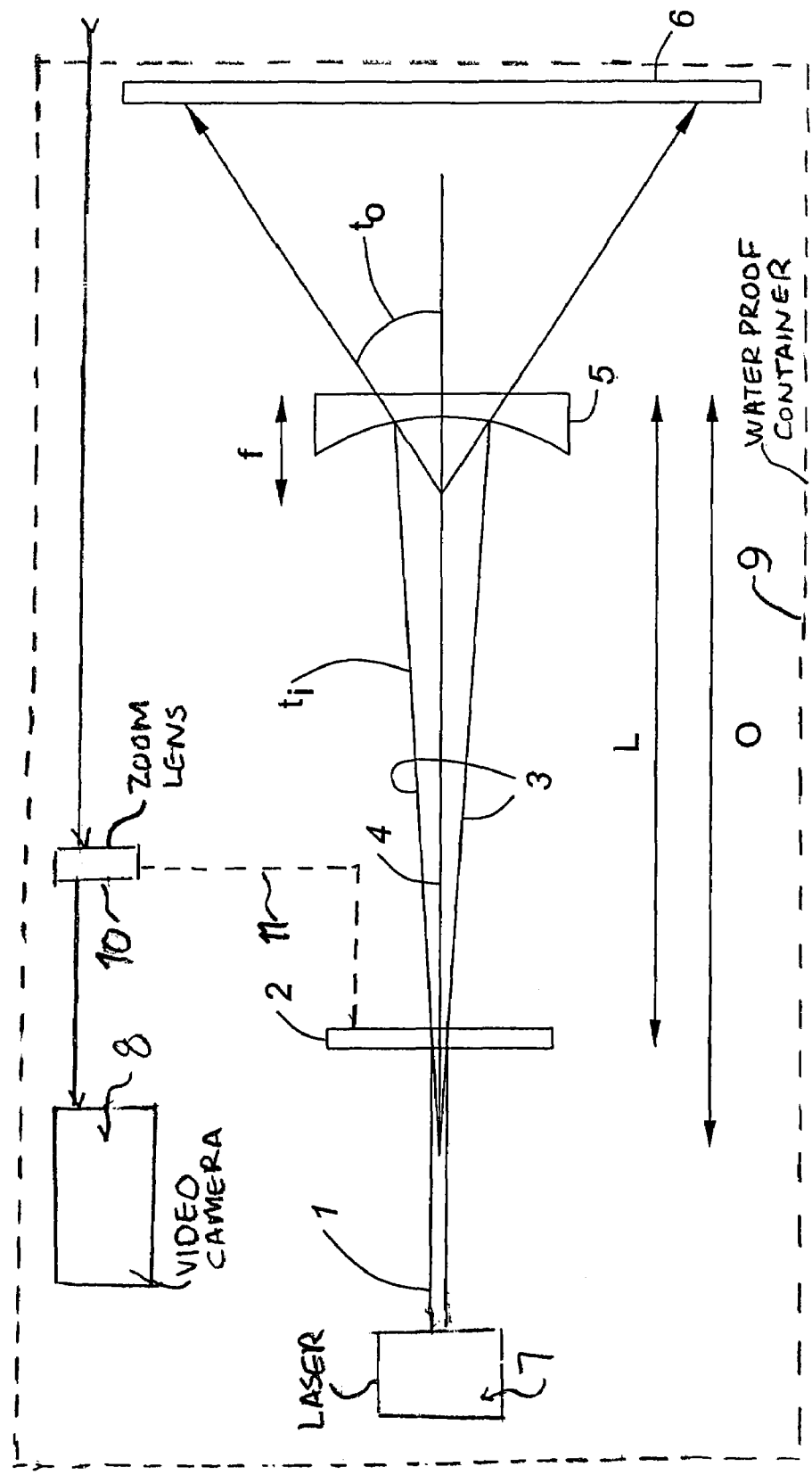
FIG. 1 is a schematic diagram of a laser beam shaper to illuminate a target in a field-of-view of a video camera according to the present invention.
Figure 2A:
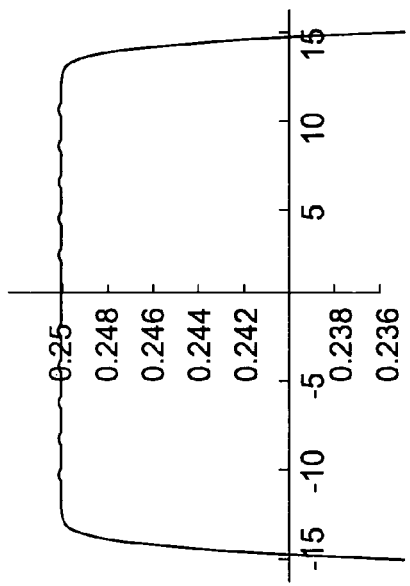
FIGS. 2a to 2d, 3a, 3b, 4a to 4d, 5a to 5d are graphs of illumination uniformity results obtained by varying a given parameter.
Figure 2B:
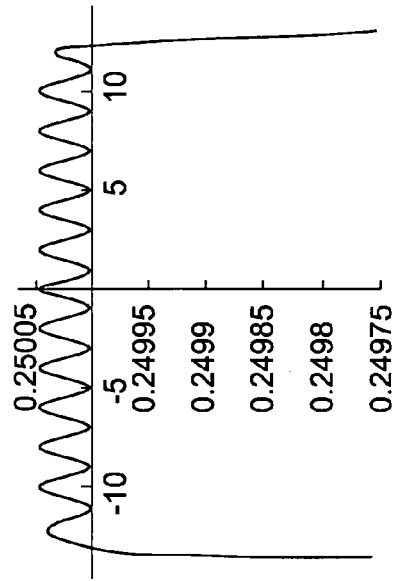
Figure 2C:
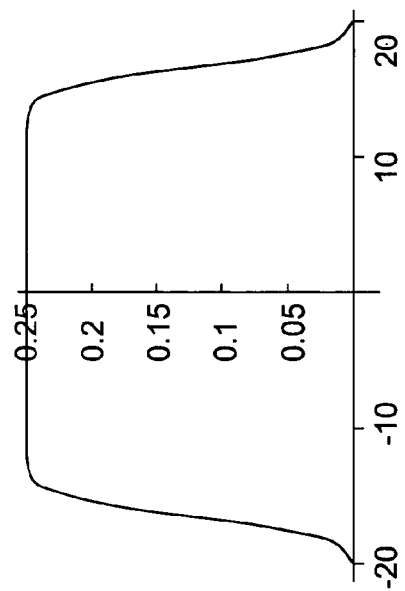
Figure 2D:
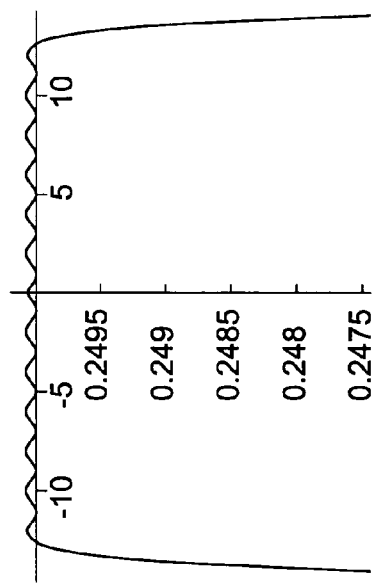

Referring to FIG. 1, the device according to the present invention has a binary holographic laser beam shaper (beam shaper) 2 for a green laser beam 1 from a Nd:YAG laser (not shown) directed to the beam shaper 2 to provide a 4 by 3 aspect ratio beam array that has the same aspect ratio as that for the video camera (not shown). The beam shaper 2 is mounted on a platform, which for the sake of clarity is not shown. The center 4 of the laser beam 1 is first aligned with the center of the diverging lens 5. The beam shaper 2 is subsequently mounted on the platform between the diverging lens 5 and the output 1 of the laser. The platform on which 2 is mounted can move back and forth and at one limit bring the beam shaper 2 very near the input plane of the diverging lens 5 and at another limit very near the output window of the laser. It should be particularly pointed out that because the holographic element is the only moving part of the apparatus it is completely insensitive to the motion and vibration of the beam shaper 2. This is due to the fact that by its very nature the holographic pattern is repeated across the whole beam shaper 2 and the effect of the beam shaper 2 on the laser beam is therefore completely independent of the beam's position on the beam shaper's holographic plate 2. The holographic plate 2 creates a bundle of N by M beams each separated from the others by the same fixed angle increment. In one implementation the bundle of beams is an array of 17 beams wide by 13 beams in height, each beam being separated, from the other by one degree. This combination of all the beams gives rise to a rectangular pattern with a width to height ratio identical to that of a standard video camera. Each of the beams has its own width or divergence. This divergence is due to the intrinsic divergence of the laser beam and the divergence of the final optional diffuser 6 located at the output of the diverging lens 5. The optional holographic diffuser 6 smoothes any remaining interference pattern in the beam array and will add an angle $t_f$, the diffusing angle, to the total output angle. The angular divergence pattern of each individual beam in the array can be represented by a Gaussian (normal distribution). The convolution of the divergence of each individual beam gives rise to a considerable amount of smoothing in intensity. Detailed consideration and formulae to optimize this smoothing to obtain the best overall uniform intensity are given in the following paragraphs.

Starting with the following definitions, the half beam diameter of the incoming laser is given by b. The spacing between the beam shaper 2 and the diverging lens 5 is denoted by L. The half angle along the diagonal of the beam array is given by $t_i$ (see FIG. 1). The half angle along the diagonal of the beam array after passing through the diverging lens 5 is given by t (see FIG. 1). The apparent object distance of the input laser beam with respect to the diverging lens 5 is given by $O=L+bt_i$. Then, the angular magnification ration (zoom ratio) is:

$$\text{Tan}(t)/\text{Tan}(t_i) = 1 + O/f, \quad (1)$$

f being the focal length of the diverging lens. Simplifying, to obtain the angle ratio directly, one obtains the magnification factor M as $$M = (t/t_i) = A \tan[(1+O/f) \text{Tan}(t_i)]/t_i \quad (2)$$

$$M = (t/t_i) = A \tan[(1+(L+b\ t_i)/f) \text{Tan}(t_i)]/t_i \quad (3)$$

If the diffusing angle added by the convolution of the final smoothing diffuser is significant it can be accounted for as follows:

$$M = \{(t+t_f)/t_i\} = \{t_f + A\tan[(1+(L+b\ t_i)/f) \text{Tan}(t_i)]\}/t_i \quad (4)$$

The above formulae show clearly how the magnification increases as the distance between the beam shaper 2 and the diverging lens 5 is increased. By synchronizing the motion of the carriage on which the beam shaper 2 is mounted with the zoom factor of the zoom lens, a motorized F1.8 lens with a variable focus length from 16 to 160 mm and variable focus from 1.5 m to infinity, of the gated camera, it is possible to match the field of illumination of the laser with the field-of-view of the video camera. This is the optimal situation in terms of maximizing the efficiency of illumination as long as the illumination is uniform. Optimization of the uniformity of illumination using an appropriate diffuser is discussed in the following paragraphs.

In one dimension, given a spacing of 2Δ between beams, the total intensity can be expressed as a combination of two Gaussian beams such that:

$$I(x, \Delta, \sigma) = e^{-\frac{(x-\Delta)^2}{\sigma^2}} + e^{-\frac{(x+\Delta)^2}{\sigma^2}} \quad (5)$$

where σ is the beam width, and x the spatial extent of the beam.

One way to obtain the most uniform distribution possible is to require that the amplitude at the center point (x=0) between the beams be the same as the amplitude at the origin points of the Gaussians (i.e. x=−Δ & x=Δ). Thus, at the center, the intensity can be expressed as:

$$I(0, \Delta, \sigma) = 2e^{-\frac{(\Delta)^2}{\sigma^2}}; \quad (6)$$

and at the two origin points, the intensity can be expressed as:

$$I(\Delta, \Delta, \sigma) = I(-\Delta, \Delta, \sigma) = 1 + e^{-\frac{(4\Delta)^2}{\sigma^2}} \quad (7)$$

Changing variables, such that $$z = e^{-\frac{\Delta^2}{\sigma^2}},$$

the equality condition, $I(\Delta,\Delta,\sigma) = I(0,\Delta,\sigma)$, produces the following equation $$z^4 + 1 = 2z \quad (8)$$

The first root of equation (8) is trivial and equal to 1. This solution represents the $$\frac{\Delta}{\sigma} = 0 \text{ case.}$$

The second root is the only other real (i.e. not complex) root and is the only one of interest here. It is $$z = 0.543689 \rightarrow \frac{\Delta}{\sigma} = 0.780627 \quad (9)$$

With this condition on σ, the level of fluctuation in the entire zone from (x=−Δ) to (x=Δ) is less than ±1%.

The two-dimensional case with 4 corner points follows the same reasoning and surprisingly leads to the same result. Consider the following 4 points taken in the counter clockwise direction:

$$\text{point } A \text{ at } x = \Delta, y = \Delta \quad (10)$$

$$\text{point } B \text{ at } x = -\Delta, y = \Delta \quad (11)$$

$$\text{point } C \text{ at } x = -\Delta, y = -\Delta \quad (12)$$

$$\text{point } D \text{ at } x = \Delta, y = -\Delta \quad (13)$$

Then $$I(A) = e^{-\frac{(x-\Delta)^2}{\sigma^2}} e^{-\frac{(y-\Delta)^2}{\sigma^2}} \quad (14)$$

$$I(B) = e^{-\frac{(x+\Delta)^2}{\sigma^2}} e^{-\frac{(y-\Delta)^2}{\sigma^2}} \quad (15)$$

$$I(C) = e^{-\frac{(x+\Delta)^2}{\sigma^2}} e^{-\frac{(y+\Delta)^2}{\sigma^2}} \quad (16)$$

$$I(D) = e^{-\frac{(x-\Delta)^2}{\sigma^2}} e^{-\frac{(y+\Delta)^2}{\sigma^2}} \quad (17)$$

The contribution at the center point from the four corners is:

$$I(0) = 4e^{\frac{2\Delta^2}{\sigma^2}}, \quad (18)$$

and the contribution at point A from itself and the three other corners is:

$$I(A) = I(B) = I(C) = I(D) = 1 + e^{\frac{4\Delta^2}{\sigma^2}} + e^{\frac{4\Delta^2}{\sigma^2}} + e^{\frac{8\Delta^2}{\sigma^2}} \quad (19)$$

Changing variables to $$z = e^{\frac{2\Delta^2}{\sigma^2}}$$

the equality condition, I(A)=I(0) gives:

$$z^4 + 2z^2 + 1 = 4z. \quad (20)$$

Once again, as in the one-dimensional case, the first root of equation (19) is trivial and equal to 1. This solution represents the $$\frac{\Delta}{\sigma} = 0 \text{ case.}$$

The second root is also the only other real (i.e. not complex) root and is again the only one of interest. It is $$z = 0.295598 \rightarrow \frac{\Delta}{\sigma} = 0.780627, \quad (21)$$

exactly the same solution as for one-dimensional case. From the corners to the center point of the grid, the maximum difference is now less than ±1.5%. This increase is due to the fact that the spacing from the corners to the center is $\sqrt{2}\Delta$ instead of just $\Delta$.

It should be noted that x, $\Delta$, $\sigma$ are in fact angles, angular spacing and angular width. The spatial analogy was simply used to render the arguments easier to follow and more intuitive.

Figure 3B:
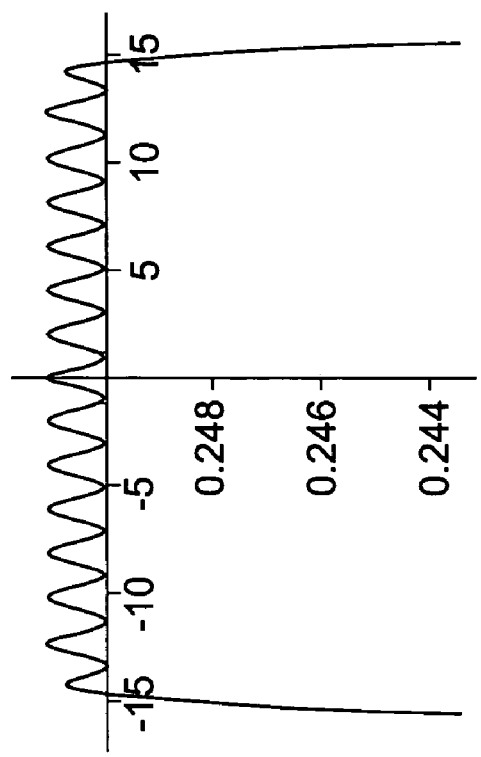
Figure 3A:
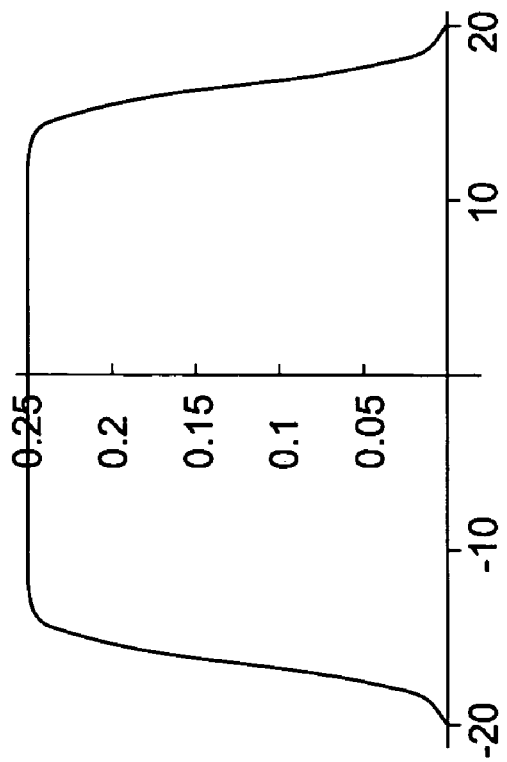
Figure 4B:
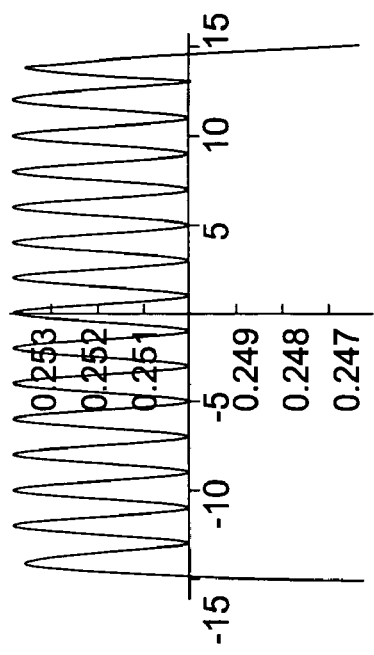
Figure 4D:
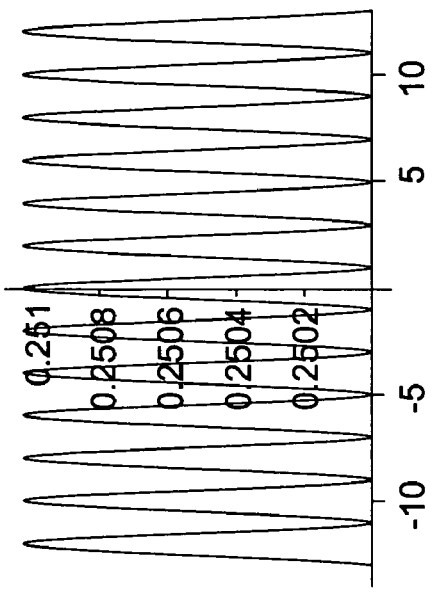
Figure 4A:
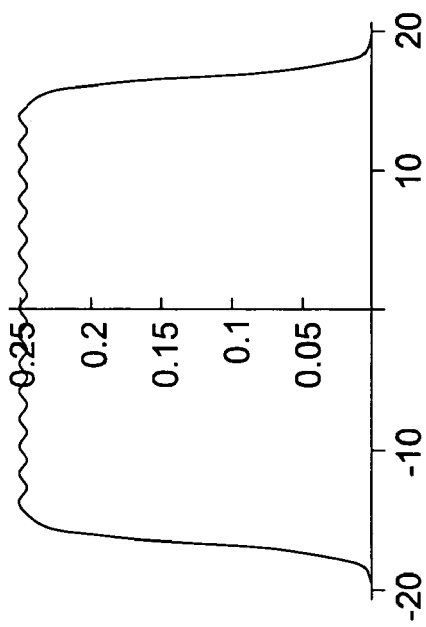
Figure 4C:
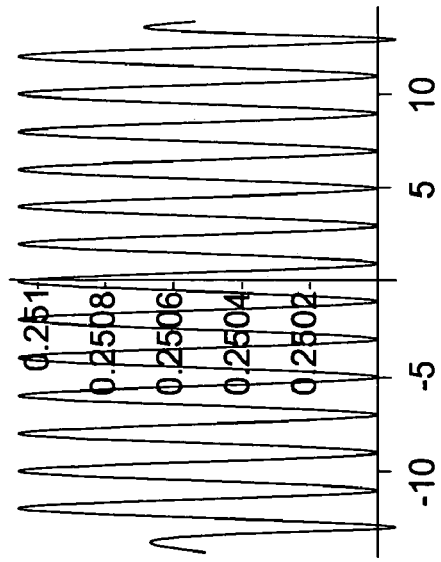
Figure 5A:
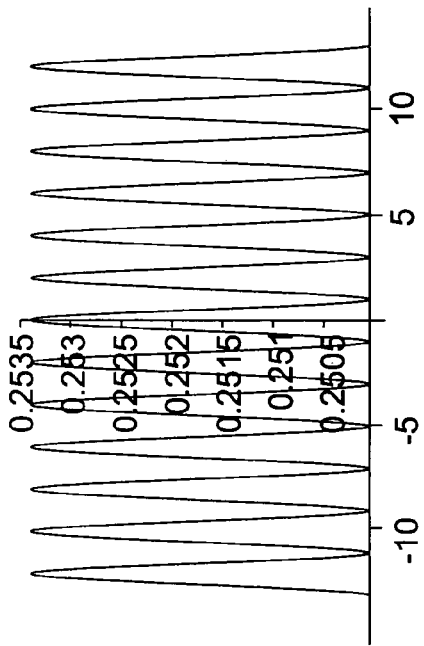
Figure 5B:
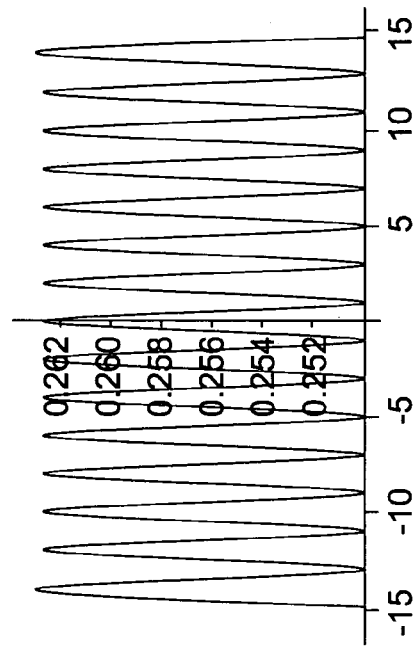
Figure 5C:
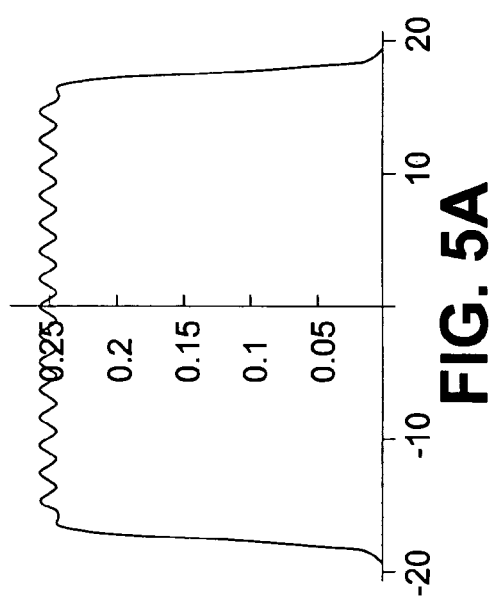
Figure 5D:
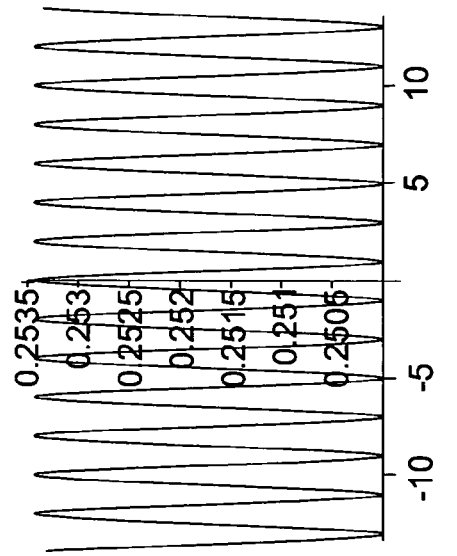

The graphs in FIGS. 2a to 2d are the illumination uniformity results obtained when $$\frac{\Delta}{\sigma} = .5$$

for 13 by 17 beams. The graphs in FIGS. 3a and 3b are the illumination uniformity results obtained when $$\frac{\Delta}{\sigma} = .66$$

for 13 by 17 beams. The graphs in FIGS. 4a to 4d are the illumination uniformity results obtained when $$\frac{\Delta}{\sigma} = .66$$

for 13 by 17 beams and graphs in FIGS. 5a to 5d are the illumination uniformity results obtained when $$\frac{\Delta}{\sigma} = .75$$

for 13 by 17 beams.

The Quik 05A model camera and the newer 4Picos model cameras from Stanford Computer Optics were operated in a system described above in a first generation system. These models of cameras have different shutter or integration times. A system according to the present invention allows the camera to obtain an image of a target 3 to 5 times further than a conventional system.

In one prototype the size is about 28 cm in diameter by 75 cm long with a weight of 40 kg and is equipped with a sonar altimeter along with pressure and leak sensors.

Various modifications may be made to the preferred embodiments without departing from the spirit and scope of the invention as defined in the appended claims. The Nd:YAG laser crystal which can produce about 1.4 W of green radiation, for instance, can be temperature stabilized by Pelletier elements connected so that they can either heat or cool the laser crystal depending on its temperature. Furthermore, the video camera can obtain images in air through fog, snow or rain via selecting a suitable laser and narrow band filter for the camera, with the distance to the target area determined via a laser range finder.

The invention claimed is:

1. An apparatus to obtain images of an underwater target which is located in the field-of-view of a video camera in a waterproof container includes a means to determine the distance between the container and the target and a laser to illuminate the target with a laser beam, a pulse from the laser beam being directed to a holographic beam shaper for producing a plurality of laser beams, located between the laser and a diverging lens that combines the laser beams and directs the laser beams from the beam shaper towards the target, so as to provide illumination of the target area which is of an overall uniform density and which comprises a pattern having a height to width ratio that matches that of the field-of-view of the camera, the video camera's shutter being kept closed until the laser beams travel to the target and nearly back to the camera and means then to open the camera's shutter and obtain an image of the target.

2. An apparatus to obtain images of an underwater target as defined in claim 1, wherein the holographic beam shaper is mounted on a platform that is moveable between a location near the diverging lens and one near the laser.

3. An apparatus to obtain images of an underwater target as defined in claim 2, wherein movement of a zoom lens for the video camera is synchronized with movement of the holographic beam shaper.

4. An apparatus to obtain images of an underwater target as defined in claim 3, wherein the holographic beam shaper creates an array of beams with a 4 by 3 aspect ratio, images from the video camera having a 4 by 3 aspect ratio.

5. An apparatus to obtain images of an underwater target as defined in claim 4, wherein the array of beams is 17 beams wide by 13 beams in height.

6. An apparatus to obtain images of an underwater target as defined in claim 1, wherein the means to determine the distance between the container and the target is comprises a sonar ranging device attached to the container.

7. An apparatus to obtain images of an underwater target as defined in claim 2, wherein the means to determine the distance between the container and the target is a sonar ranging device attached to the container.

8. An apparatus to obtain images of an underwater target as defined in claim 4, wherein the means to determine the distance between and the container and the target is a sonar ranging device attached to the container.

9. An apparatus to obtain images in the field-of-view for the camera includes a means to determine the distance to a target area and a laser to illuminate the target area with a laser beam, a pulse from the laser beam being directed to a holographic beam shaper for producing a plurality of laser beams, located between the laser and a diverging lens that combines the laser beams and directs the laser beams from the beam shaper to the target area, so as to provide illumination of the target area which is of an overall uniform density and which comprises a pattern having a height to width ratio that matches that of the field-of-view of the camera, the video camera's shutter being kept closed until the laser beams travel to the target and nearly back to the camera and means then to open the camera's shutter and obtain an image of the target area.

10. an apparatus to obtain images of an underwater target which is located in the field-of-view of a video camera in a waterproof container includes a means to determine the distance between the container and the target and a laser to illuminate the target with a laser beam, a pulse from the laser beam being directed to a holographic beam shaper for producing a plurality of laser beams, located between the laser and a diverging lens that combines the laser beams and directs the laser beams from the beam shaper towards the target, so as to provide illumination of the target area which is of an overall uniform density and which comprises a pattern having a height to width ratio that matches that of the field-of-view of the camera, the video camera's shutter being kept closed until the laser beams travel to the target and nearly back to the camera and means then to open the camera's shutter and obtain an image of the target, wherein the holographic beam shaper being mounted on a platform that is moveable between a location near the diverging lens and one near the laser.

* * * * *

UNITED STATES PATENT AND TRADEMARK OFFICE
CERTIFICATE OF CORRECTION

PATENT NO. : 7,507,940 B2 Page 1 of 1
APPLICATION NO. : 11/335471
DATED : March 24, 2009
INVENTOR(S) : Fournier et al.

It is certified that error appears in the above-identified patent and that said Letters Patent is hereby corrected as shown below:

In column 8, line 6, change "an apparatus" to -- An apparatus --.

Signed and Sealed this

Fourth Day of August, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,507,940 B2  Page 1 of 1
APPLICATION NO. : 11/335471
DATED : March 24, 2009
INVENTOR(S) : Fournier et al.

It is certified that error appears in the above-identified patent and that said Letters Patent is hereby corrected as shown below:

In column 2, lines 41-42, change "(not shown)" to -- , indicated at 7, --.

In column 2, line 44, change "(not shown)" to -- , which is indicated at 8 --.

In column 2, line 49, change "laser." to -- laser 7. --.

In column 3, between lines 13 and 14, insert the following paragraph:

-- The device including video camera 8 is contained in a waterproof container indicated schematically at 9. A zoom lens for camera 8 is indicated schematically at 10. The movement of zoom lens 10 is synchronized with that of beam shaper 2 as indicated by dashed line 11. --.

Signed and Sealed this

First Day of September, 2009

David J. Kappos
*Director of the United States Patent and Trademark Office*